US012735998B2

(12) United States Patent
Takaki et al.

(10) Patent No.: US 12,735,998 B2
(45) Date of Patent: Sep. 15, 2026

(54) STEAM SUPPLY SYSTEM AND STEAM SUPPLY METHOD

(71) Applicant: MITSUBISHI HEAVY INDUSTRIES, LTD., Tokyo (JP)

(72) Inventors: Kazushige Takaki, Tokyo (JP); Yosuke Nakagawa, Tokyo (JP); Takashi Sonoda, Tokyo (JP); Hiroshi Tsujikawa, Tokyo (JP); Daisuke Hiura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 19/239,429

(22) Filed: Jun. 16, 2025

(65) Prior Publication Data

US 2026/0015953 A1 Jan. 15, 2026

(30) Foreign Application Priority Data

Jul. 12, 2024 (JP) .................................. 2024-11882

(51) Int. Cl.
*F01K 23/10* (2006.01)
*F02G 5/02* (2006.01)

(52) U.S. Cl.
CPC ................ *F01K 23/10* (2013.01); *F02G 5/02* (2013.01)

(58) Field of Classification Search
CPC ........ F01K 23/10; F01K 13/02; F01K 23/101; F02G 5/02
See application file for complete search history.

(56) References Cited

U.S. PATENT DOCUMENTS

| | | | | |
|---|---|---|---|---|
| 2011/0011088 | A1* | 1/2011 | Iijima | B01D 53/1412 60/645 |
| 2011/0304155 | A1 | 12/2011 | Hoffmann et al. | |
| 2012/0096863 | A1 | 4/2012 | Sasanuma et al. | |
| 2021/0079823 | A1* | 3/2021 | Tsujiuchi | F01K 17/02 |
| 2021/0356129 | A1* | 11/2021 | Tanaka | F01N 3/0842 |
| 2022/0099021 | A1* | 3/2022 | Uechi | B01J 19/0013 |

FOREIGN PATENT DOCUMENTS

| | | |
|---|---|---|
| JP | 2011-256870 | 12/2011 |
| JP | 5637809 | 12/2014 |
| JP | 5968176 | 8/2016 |
| JP | 2024-108439 | 8/2024 |
| WO | 2019/208416 | 10/2019 |

* cited by examiner

*Primary Examiner* — Hoang M Nguyen
(74) *Attorney, Agent, or Firm* — Wenderoth, Lind & Ponack, L.L.P.

(57) ABSTRACT

A steam supply method involves a $CO_2$ recovery device, a first line through which low-pressure steam is extracted from a low-pressure line for supply of the low-pressure steam to a steam turbine and to the $CO_2$ recovery device, and a second line through which medium-pressure steam is extracted from a medium-pressure line for supply of the medium-pressure steam to the first line. A low-pressure steam governing valve is provided upstream of a connection position of the low-pressure line with the first line. A medium-pressure steam governing valve of the medium-pressure line, and a steam backup valve of the second line are provided. The method includes closing the low-pressure steam governing valve and the medium-pressure steam governing valve and opening the steam backup valve based on a state of operation of the power plant.

12 Claims, 4 Drawing Sheets

STEAM SUPPLY SYSTEM AND STEAM SUPPLY METHOD

BACKGROUND OF THE INVENTION

Field of the Invention

The present disclosure relates to a steam supply system and a steam supply method for supply of steam to a $CO_2$ recovery device. The present disclosure claims priority based on Japanese Patent Application No. 2024-112882 filed in Japan on Jul. 12, 2024, the contents of which are incorporated herein by reference.

Description of Related Art

A plant in which a gas turbine combined cycle (GTCC) is combined with a $CO_2$ recovery device has been provided. Disclosed in Japanese Unexamined Patent Application, First Publication No. 2011-256870 is a configuration in which, in a plant in which a GTCC and a $CO_2$ recovery device are combined with each other, a medium-pressure steam supply line through which medium-pressure steam generated at a heat recovery steam generator is supplied to the $CO_2$ recovery device and a low-pressure steam supply line through which a portion of low-pressure steam is extracted from a low-pressure line for supply of the low-pressure steam from the heat recovery steam generator to a steam turbine and is supplied to the $CO_2$ recovery device are provided. In the case of such a plant, it is possible to supplement the amount of steam supplied to the $CO_2$ recovery device, which is likely to be insufficient at the time of activation of the plant, by supplying steam through the medium-pressure steam supply line at the time of activation of the plant.

SUMMARY OF THE INVENTION

In addition to a situation where the plant is activated, in a situation such as a situation where the plant is stopped, a situation where there is load rejection, or a situation where a steam turbine trip occurs, a steam governing valve provided in the low-pressure steam supply line may be closed and low-pressure steam may become not able to be supplied to the $CO_2$ recovery device, which results in a decrease in $CO_2$ recovery rate.

The present disclosure provides a steam supply system and a steam supply method with which it is possible to solve the above-described problem.

According to an aspect of the present disclosure, there is provided a steam supply system that supplies steam generated at a heat recovery steam generator to a CO2 recovery device that recovers CO2 from an exhaust gas discharged by a power plant including a gas turbine, the heat recovery steam generator, and a steam turbine, the system including a low-pressure line through which low-pressure steam is supplied from the heat recovery steam generator to the steam turbine, a first line that is connected to the low-pressure line and through which the low-pressure steam is extracted from the low-pressure line and is supplied to the CO2 recovery device, a low-pressure steam governing valve that is provided upstream of a connection position of the low-pressure line with the first line, a medium-pressure line through which medium-pressure steam is supplied from the heat recovery steam generator to the steam turbine, a second line that is connected to the medium-pressure line and through which the medium-pressure steam is extracted from the medium-pressure line and is supplied to the first line, a medium-pressure steam governing valve provided at the medium-pressure line, a steam backup valve provided at the second line, and a control device, in which the control device closes the low-pressure steam governing valve and the medium-pressure steam governing valve and opens the steam backup valve based on a state of operation of the power plant.

According to an aspect of the present disclosure, there is provided a steam supply method of supplying steam generated by a heat recovery steam generator to a CO2 recovery device in a plant including a power plant that includes a gas turbine, the heat recovery steam generator, and a steam turbine, the CO2 recovery device that recovers CO2 from an exhaust gas of the power plant, a first line through which low-pressure steam is extracted from a low-pressure line for supply of the low-pressure steam from the heat recovery steam generator to the steam turbine and is supplied to the CO2 recovery device, a second line through which medium-pressure steam is extracted from a medium-pressure line for supply of the medium-pressure steam from the heat recovery steam generator to the steam turbine and is supplied to the first line, a low-pressure steam governing valve that is provided upstream of a connection position of the low-pressure line with the first line, a medium-pressure steam governing valve provided at the medium-pressure line, and a steam backup valve provided at the second line, the method including closing the low-pressure steam governing valve and the medium-pressure steam governing valve and opening the steam backup valve based on a state of operation of the power plant.

According to the steam supply system and the steam supply method described above, it is possible to supplement the amount of supply of steam to a $CO_2$ recovery device and to maintain a $CO_2$ recovery rate in a plant in which a GTCC and a $CO_2$ recovery device are combined with each other in a case where the amount of supply of steam from a heat recovery steam generator to the $CO_2$ recovery device is reduced in a situation such as a situation where the plant is stopped, a situation where there is load rejection, or a situation where a steam turbine trip occurs.

DETAILED DESCRIPTION OF THE INVENTION

Overview

Hereinafter, the way in which supply of steam to a $CO_2$ recovery device according to the present disclosure is controlled will be described with reference to FIGS. 1 to 8.

Figure 1:
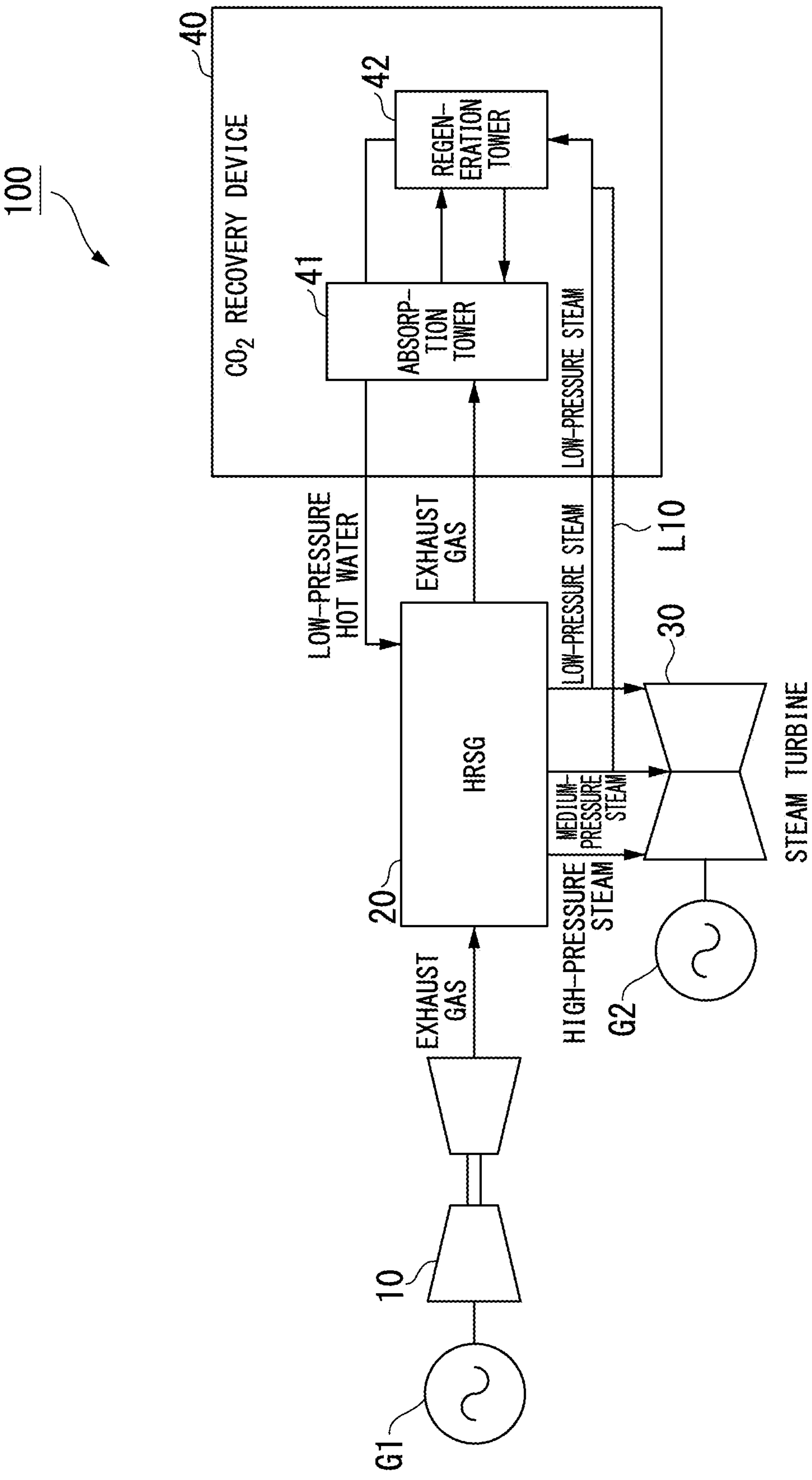
FIG. 1 is a schematic view of a plant according to each embodiment.

FIG. 1 shows the schematic configuration of a plant in which a combined cycle power plant (GTCC) and a $CO_2$ recovery device are combined. A plant 100 includes a gas turbine 10, a heat recovery steam generator (HRSG) 20, a steam turbine 30, a $CO_2$ recovery device 40, generators G1 and G2, and a control device 50. The generator G1 is connected to the gas turbine 10, and the generator G1 is driven by the gas turbine 10. The generator G2 is connected to the steam turbine 30, and the generator G2 is driven by the steam turbine 30. An exhaust gas discharged from the gas turbine 10 is sent to the HRSG 20 and then sent to the $CO_2$ recovery device 40 after being used in the HRSG 20. The HRSG 20 recovers heat from the exhaust gas to generate high-pressure steam, medium-pressure steam, and low-pressure steam, and supplies the high-pressure steam, the medium-pressure steam, and the low-pressure steam to the steam turbine 30. The HRSG 20 supplies, to a regeneration tower 42 of the $CO_2$ recovery device 40, a portion of the low-pressure steam that is extracted from a line for supply of the low-pressure steam to the steam turbine connected to the HRSG 20. In addition, the HRSG 20 sends the exhaust gas after heat recovery to the $CO_2$ recovery device 40. The $CO_2$ recovery device 40 includes an absorption tower 41 and the regeneration tower 42, and causes absorption liquid to circulate between the absorption tower 41 and the regeneration tower 42 to extract $CO_2$ from the exhaust gas sent from the HRSG 20. For extraction of $CO_2$, steam is required as a heat source, and in the plant 100, low-pressure steam supplied from the HRSG 20 is used as a heat source. Low-pressure steam used during $CO_2$ extraction condenses to become low-pressure hot water, and the generated low-pressure hot water is supplied from the $CO_2$ recovery device 40 to the HRSG 20. In such a configuration, steam cannot be supplied to the $CO_2$ recovery device 40 until a sufficient amount of low-pressure steam is generated at the HRSG 20 after activation of a GTCC. Therefore, a medium-pressure gas extraction line L10 through which a portion of medium-pressure steam is extracted from the HRSG 20 and the medium-pressure steam is supplied to the $CO_2$ recovery device 40 is provided, and the control device 50 performs control to switch between a line through which low-pressure steam is supplied to the $CO_2$ recovery device 40 and the medium-pressure gas extraction line L10 such that a portion of the medium-pressure steam, which is generated such that a sufficient amount of the medium-pressure steam is generated at an early stage in comparison with the low-pressure steam, is supplied to the $CO_2$ recovery device 40 through the medium-pressure gas extraction line L10 at the time of activation of the GTCC. Therefore, a sufficient amount of steam can be supplied to the $CO_2$ recovery device 40 even at the time of activation of the GTCC. In addition, low-pressure steam cannot be supplied to the $CO_2$ recovery device 40 not only at the time of activation of the plant but also in situations such as a situation where the plant is stopped, a situation where there is load rejection, and a situation where a trip of the steam turbine 30 occurs since steam governing valves (V2, V5, and V7 in FIG. 2) are closed in such situations. However, in the present embodiment, steam is supplied to the $CO_2$ recovery device 40 through the medium-pressure gas extraction line L10 even in such situations so that a shortage of the low-pressure steam is supplemented.

Figure 2:
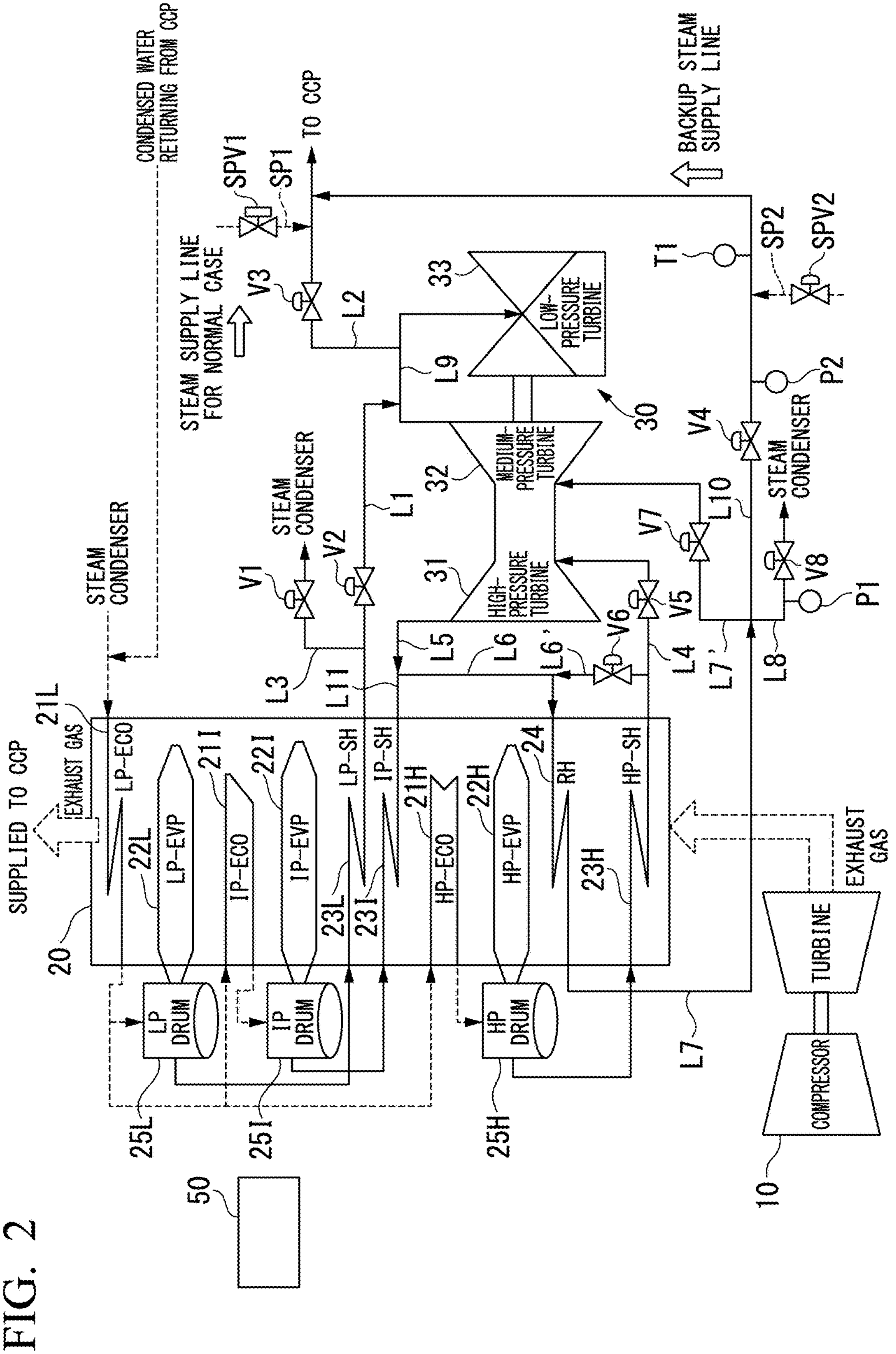
FIG. 2 is a diagram showing an example of a main part of a plant configuration according to each embodiment.

FIG. 2 is a diagram showing an example of a main part of a plant configuration according to each embodiment. The HRSG 20 provided in a stage after the gas turbine 10 includes a low-pressure economizer 21L, a medium-pressure economizer 21I, a high-pressure economizer 21H, a low-pressure evaporator 22L, a medium-pressure evaporator 22I, a high-pressure evaporator 22H, a low-pressure superheater 23L, a medium-pressure superheater 23I, a high-pressure superheater 23H, a reheater 24, a low-pressure drum 25L, a medium-pressure drum 25I, and a high-pressure drum 25H. The steam turbine 30 includes a high-pressure turbine 31, a medium-pressure turbine 32, and a low-pressure turbine 33. Low-pressure steam is supplied from the low-pressure superheater 23L to the low-pressure turbine 33 through a line L1 and a line L9. A line L2 leading to the $CO_2$ recovery device 40 is connected to the line L9, and a portion of the low-pressure steam supplied from the low-pressure superheater 23L branches to be supplied to the $CO_2$ recovery device 40 (the regeneration tower 42) through the line L2. Furthermore, a line L3 that branches off from the line L1 is provided upstream of a connection point between the line L1 and the line L9 (upstream of the connection point in a direction in which steam flows (hereinafter, simply described like "being upstream of" or "being downstream of")), and a low-pressure turbine bypass valve V1 is provided at the line L3. In a time period during which the plant is activated and the amount of low-pressure steam generation is small, the low-pressure turbine bypass valve V1 is opened so that low-pressure steam is sent to a steam condenser (not shown) through the line L3 while bypassing the low-pressure turbine 33. A low-pressure steam governing valve V2 is provided upstream of the connection point between the line L1 and the line L9 while being provided downstream of a point at which the line L3 branches off from the line L1 (CCP means the $CO_2$ recovery device). In addition, the line L2 is provided with a low-pressure steam extraction valve V3. In addition, a temperature adjustment spray SP1 for adjustment (cooling) of a low-pressure steam temperature to an appropriate temperature and a temperature adjustment spray valve SPV1 for adjustment of the flow rate of misty water sprayed from the temperature adjustment spray SP1 are provided downstream of the low-pressure steam extraction valve V3.

High-pressure steam is supplied from the high-pressure superheater 23H to the high-pressure turbine 31 through a line L4. The line L4 is provided with a high-pressure steam governing valve V5 that adjusts the flow rate of the high-pressure steam. A line L6' is connected to the line L4, and the line L6' is provided with a high-pressure turbine bypass valve V6. In a case where the high-pressure turbine bypass valve V6 is opened, the high-pressure steam flows to the reheater 24 through the line L6' and a line L6 while bypassing the high-pressure turbine 31. The high-pressure steam supplied to the high-pressure turbine 31 is returned to the reheater 24 through a line L5 and the line L6. The line L5, a line L11 on an outlet side of the medium-pressure superheater 23I, and the line L6' join the line L6.

Medium-pressure steam is supplied from the reheater 24 to the medium-pressure turbine 32 through a line L7 and a line L7'. The line L7' is provided with a medium-pressure steam governing valve V7 that adjusts the flow rate of the medium-pressure steam. A line L8 is connected to the line L7, and the line L8 is provided with a medium-pressure turbine bypass valve V8. In a case where the medium-pressure turbine bypass valve V8 is opened, the medium-pressure steam flows to the steam condenser (not shown) through the line L8 while bypassing the medium-pressure turbine 32. A pressure gauge P1 is provided upstream of the medium-pressure turbine bypass valve V8 of the line L8. The medium-pressure steam supplied to the medium-pressure turbine 32 is supplied to the low-pressure turbine 33 or the $CO_2$ recovery device 40 through the line L9. The medium-pressure gas extraction line L10 leading to the line L2, which is a line for supply of steam to the $CO_2$ recovery device 40, is connected to the line L7. The medium-pressure gas extraction line L10 is provided with a medium-pressure backup steam pressure adjustment valve V4, and the medium-pressure gas extraction line L10 is a line provided to supply medium-pressure steam to the $CO_2$ recovery device 40 at the time of activation of the GTCC, during a plant stoppage sequence, at the time of load rejection, at the time of a steam turbine trip, and the like. A pressure gauge P2 is provided downstream of the medium-pressure backup steam pressure adjustment valve V4 in the medium-pressure gas extraction line L10. A temperature adjustment spray SP2 for adjustment (cooling) of the temperature of medium-pressure steam to an appropriate temperature and a temperature adjustment spray valve SPV2 for adjustment of the flow rate of misty water sprayed from the temperature adjustment spray SP2 are provided in the vicinity of (for example, downstream of) a position where the pressure gauge P2 is provided. A thermometer T1 that measures the temperature of steam flowing in the medium-pressure gas extraction line L10 is provided downstream of the temperature adjustment spray SP2 of the medium-pressure gas extraction line L10. The medium-pressure gas extraction line L10 is connected to, for example, the line L2 at a position downstream of the temperature adjustment spray SP1. Low-pressure steam or medium-pressure steam generated by the HRSG 20 is supplied to the $CO_2$ recovery device 40 through the line L2.

The control device 50 controls the opening degrees of the low-pressure turbine bypass valve V1, the low-pressure steam governing valve V2, the low-pressure steam extraction valve V3, the medium-pressure backup steam pressure adjustment valve V4, the high-pressure steam governing valve V5, the high-pressure turbine bypass valve V6, the medium-pressure steam governing valve V7, the medium-pressure turbine bypass valve V8, the temperature adjustment spray valve SPV1, and the temperature adjustment spray valve SPV2. For example, the control device 50 controls the opening degree of the medium-pressure turbine bypass valve V8 based on a measured value of the pressure gauge P1, controls the opening degree of the medium-pressure backup steam pressure adjustment valve V4 based on a measured value of the pressure gauge P2, and controls the opening degree of the temperature adjustment spray valve SPV1 based on a measured value of the thermometer T1.

First Embodiment

When the plant 100 is stopped, the steam turbine 30 is stopped, and then the gas turbine 10 is stopped. In order to stop the steam turbine 30, the control device 50 performs control in which the low-pressure steam governing valve V2, the medium-pressure steam governing valve V7, and the high-pressure steam governing valve V5 are closed. Then, the amount of steam in a pipe of the line L2 through which extraction of low-pressure steam for the $CO_2$ recovery device 40 is in progress decreases, and the amount of steam to be used by the $CO_2$ recovery device 40 as a heat source for $CO_2$ recovery becomes insufficient. In the plant stoppage sequence, an operation in which the steam governing valve V2 and the like are closed first and then fuel of the gas turbine 10 is cut off for termination of combustion is supposed to be performed. Therefore, even after a shortage of low-pressure steam, there is a time period in which an exhaust gas is continuously discharged from the gas turbine 10 due to combustion. Therefore, in the present embodiment, the medium-pressure backup steam pressure adjustment valve V4 is opened as the plant is stopped or as an operation of closing the steam governing valve V2 as triggerd. There is a surplus of steam in a medium-pressure line since the medium-pressure steam governing valve V7 is closed. By opening the medium-pressure backup steam pressure adjustment valve V4, the surplus of steam is supplied to the $CO_2$ recovery device 40 through the medium-pressure gas extraction line L10. Accordingly, a shortage of low-pressure steam is supplemented, and the $CO_2$ recovery rate from an exhaust gas of the gas turbine 10 can be maintained.

In this case, the opening degree of the medium-pressure backup steam pressure adjustment valve V4 may be set to a fixed opening degree based on a set value determined in advance or may be feedback-controlled such that a pressure measured by the pressure gauge P2 provided at a stage after the medium-pressure backup steam pressure adjustment valve V4 coincides with a target value. Alternatively, such control methods may be combined with each other. Note that the medium-pressure steam governing valve V7 is closed and the medium-pressure turbine bypass valve V8 is controlled such that a pressure measured by the pressure gauge P1 provided in a stage before the medium-pressure turbine bypass valve V8 is maintained at a target value.

Operation

Next, the flow of control performed in the case of stoppage of the plant 100 will be described with reference to FIG. 3.

Figure 3:
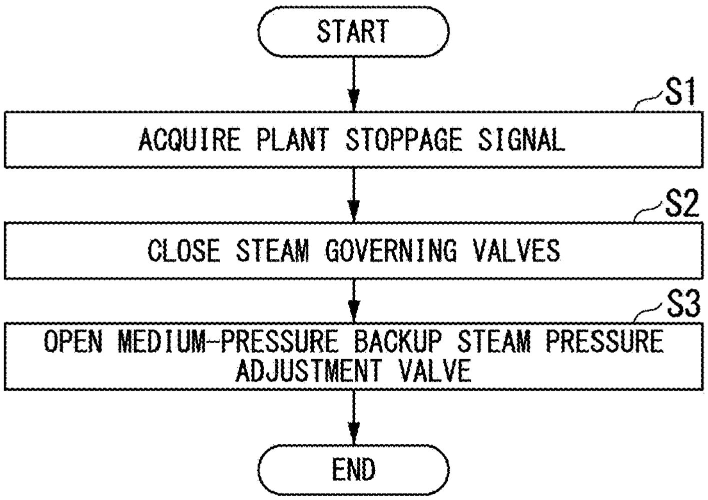
FIG. 3 is a flowchart showing an example of control according to a first embodiment.

FIG. 3 is a flowchart showing an example of control according to a first embodiment.

First, the control device 50 acquires a plant stoppage signal indicating that the plant 100 is to be stopped (step S1). The signal may be input to the control device 50 by an operator, may be received from another device, or may be generated by the control device 50 itself. In a case where the plant stoppage signal is acquired, the control device 50 closes the low-pressure steam governing valve V2, the medium-pressure steam governing valve V7, and the high-pressure steam governing valve V5 (step S2). Next, the control device 50 opens the medium-pressure backup steam pressure adjustment valve V4 that is closed (step S3). The control device 50 may perform feedback control of the opening degree of the medium-pressure backup steam pressure adjustment valve V4 such that a pressure measured by the pressure gauge P2 becomes a predetermined target value (a target pressure value at which a required amount of steam supply can be realized), or may open the medium-pressure backup steam pressure adjustment valve V4 at a predetermined opening degree (a fixed opening degree value at which a required amount of steam supply can be realized). Alternatively, the feedback control and control in which the medium-pressure backup steam pressure adjustment valve V4 is opened at the predetermined opening degree may be combined with each other. Accordingly, it is possible to stably and continuously supply the amount of steam required in the $CO_2$ recovery device 40.

In the case of the processing flow of FIG. 3, steps S1, S2, and S3 are performed in the above-described order. However, processing in step S2 and processing in step S3 may be performed at the same time or the order in which step S2 and step S3 are performed may be reversed.

Advantageous Effects

As described above, in the first embodiment, when the plant is stopped, the steam governing valves V2, V5, and V7 are closed and the medium-pressure backup steam pressure adjustment valve V4 is opened so that an amount of steam required for $CO_2$ recovery is supplied to the $CO_2$ recovery device 40. Accordingly, even in a time period in which the plant is stopped and there may be a shortage of steam supplied to the $CO_2$ recovery device 40, supply of steam can be continuously performed so that a $CO_2$ recovery rate during combustion in the gas turbine 10 can be maintained.

Second Embodiment

Control performed to supplement the amount of supply of steam, which becomes insufficient at the time of stoppage of the plant 100, has been described in the first embodiment. However, in a second embodiment, control at the time of load rejection (operation in which the plant 100 is disconnected from a power line and the plant 100 is continuously operated with no load) will be described. In a case where load rejection of the plant 100 is performed, the steam governing valves V2, V5, and V7 are closed and supply of steam is instantaneously cut off so that the steam turbine 30 is stopped. In this case, the amount of low-pressure steam supplied to the $CO_2$ recovery device 40 is reduced but $CO_2$ attributable to combustion continues to be generated since the gas turbine 10 continues to operate in a no-load state even after the load rejection. In the second embodiment, the medium-pressure backup steam pressure adjustment valve V4 is opened using the occurrence of load rejection or closure of the steam control valve as a trigger, so that $CO_2$ recovery is continued even after the load rejection. There is a surplus of steam in the medium-pressure line since the medium-pressure steam governing valve V7 is closed. With the medium-pressure backup steam pressure adjustment valve V4 being opened, the surplus of steam is supplied to the $CO_2$ recovery device 40 through the medium-pressure gas extraction line L10, so that $CO_2$ is recovered from an exhaust gas of the gas turbine 10.

The medium-pressure backup steam pressure adjustment valve V4 may be opened at the fixed opening degree based on the set value determined in advance, may be feedback-controlled such that the opening degree thereof results in a measured value of the pressure gauge P2 coinciding with a target pressure, or such control methods may be combined with each other. Note that the medium-pressure turbine bypass valve V8 is controlled such that a pressure measured by the pressure gauge P1 provided in the stage before the medium-pressure turbine bypass valve V8 is maintained at the target value.

Operation

Next, the flow of control at the time of load rejection of the plant 100 will be described with reference to FIG. 4.

Figure 4:
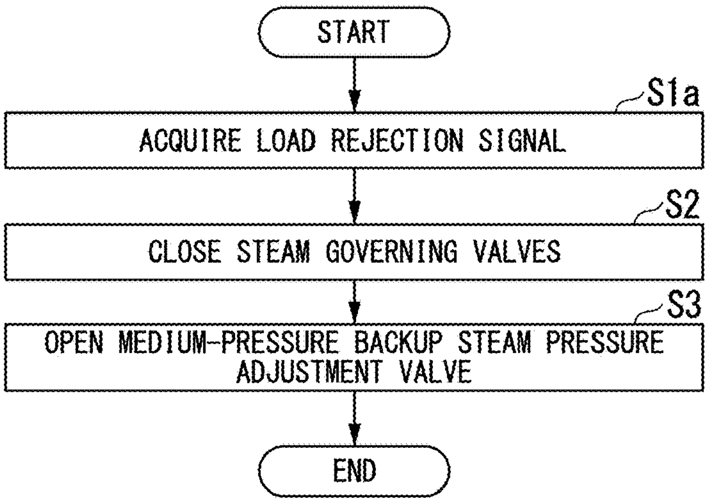
FIG. 4 is a flowchart showing an example of control according to a second embodiment.

FIG. 4 is a flowchart showing an example of control according to the second embodiment.

First, the control device 50 acquires a load rejection signal indicating that the plant 100 is to be subjected to load rejection (step S1*a*). The signal may be input to the control device 50 by an operator, may be received from another device, or may be generated by the control device 50 itself. In a case where the load rejection signal is acquired, the control device 50 closes the low-pressure steam governing valve V2, the medium-pressure steam governing valve V7, and the high-pressure steam governing valve V5 (step S2). Next, the control device 50 changes the state of the medium-pressure backup steam pressure adjustment valve V4 from a closed state to an opened state (step S3). The control device 50 may perform feedback control of the opening degree of the medium-pressure backup steam pressure adjustment valve V4 such that a pressure measured by the pressure gauge P2 becomes a predetermined target value, or may open the medium-pressure backup steam pressure adjustment valve V4 at a predetermined opening degree (fixed value). Alternatively, the control device 50 may perform a combination of the feedback control and control, in which the medium-pressure backup steam pressure adjustment valve V4 is opened at the predetermined fixed opening degree, by using a method that has been described in the first embodiment as an example.

In the case of the processing flow of FIG. 4, steps S1*a*, S2, and S3 are performed in the above-described order. However, processing in step S2 and processing in step S3 may be performed at the same time or the order in which step S2 and step S3 are performed may be reversed.

Advantageous Effects

As described above, in the second embodiment, the steam governing valves V2, V5, and V7 are closed and the medium-pressure backup steam pressure adjustment valve V4 is opened at the time of load rejection so that steam required for $CO_2$ recovery is supplied to the $CO_2$ recovery device 40. Accordingly, $CO_2$ can be recovered from an exhaust gas of the gas turbine 10 at the time of load rejection. That is, even in a time period after load rejection in which there may be a shortage of steam supplied to the $CO_2$ recovery device 40, supply of steam can be continuously performed so that a $CO_2$ recovery rate can be maintained over a period in which the gas turbine 10 is in operation with no load.

Third Embodiment

In a third embodiment, control at the time of a trip of the steam turbine 30 (hereinafter, referred to as an ST trip) (when the steam turbine 30 is stopped due to occurrence of some abnormalities or the like, and the gas turbine 10 continues to operate.) will be described. In a case where the ST trip occurs, the steam governing valves V2, V5, and V7 are closed and supply of steam is instantaneously cut off so that the steam turbine 30 is stopped. In this case, the amount of low-pressure steam supplied to the $CO_2$ recovery device 40 is reduced but the gas turbine 10 may continue to operate even after the ST trip, and $CO_2$ attributable to combustion continues to be generated over a period in which the gas turbine 10 operates. In the third embodiment, the medium-pressure backup steam pressure adjustment valve V4 is opened using the occurrence of the ST trip or the closure of the steam control valve as a trigger, so that $CO_2$ recovery is continued even after the ST trip. Accordingly, a surplus of steam that is obtained since the medium-pressure steam governing valve V7 is closed is supplied to the $CO_2$ recovery device 40 through the medium-pressure gas extraction line L10 so that a process of recovering $CO_2$ from an exhaust gas of the gas turbine 10 is continued.

The medium-pressure backup steam pressure adjustment valve V4 may be opened at the fixed opening degree based on the set value determined in advance, the opening degree of the medium-pressure backup steam pressure adjustment valve V4 may be feedback-controlled such that a measured value of the pressure gauge P2 reaches a target value, or such control methods may be combined with each other. Note that the medium-pressure turbine bypass valve V8 is controlled such that a pressure measured by the pressure gauge P1 provided in the stage before the medium-pressure turbine bypass valve V8 is maintained at the target value.

Operation

Next, the flow of control at the time of an ST trip will be described with reference to FIG. 5.

Figure 5:
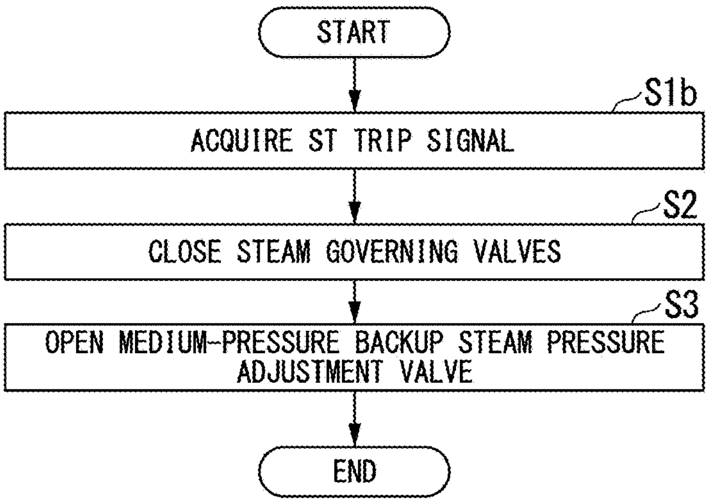
FIG. 5 is a flowchart showing an example of control according to a third embodiment.

FIG. 5 is a flowchart showing an example of control according to the third embodiment.

First, the control device 50 acquires an ST trip signal indicating occurrence of the ST trip (step S1*b*). The signal may be input to the control device 50 by an operator, may be received from another device, or may be generated by the control device 50 itself. In a case where the ST trip signal is acquired, the control device 50 closes the low-pressure steam governing valve V2, the medium-pressure steam governing valve V7, and the high-pressure steam governing valve V5 (step S2). Next, the control device 50 changes the state of the medium-pressure backup steam pressure adjustment valve V4 from a closed state to an opened state (step S3). The control device 50 may perform feedback control of the opening degree of the medium-pressure backup steam pressure adjustment valve V4 such that a pressure measured by the pressure gauge P2 becomes a predetermined target value, or may open the medium-pressure backup steam pressure adjustment valve V4 at a predetermined opening degree (fixed value).

In the case of the processing flow of FIG. 5, steps S1*b*, S2, and S3 are performed in the above-described order. However, processing in step S2 and processing in step S3 may be performed at the same time or the order in which step S2 and step S3 are performed may be reversed.

Advantageous Effects

As described above, in the third embodiment, the steam governing valves V2, V5, and V7 are closed and the medium-pressure backup steam pressure adjustment valve V4 is opened at the time of an ST trip so that steam required for $CO_2$ recovery is supplied to the $CO_2$ recovery device 40. Accordingly, even in a time period after an ST trip in which there may be a shortage of steam supplied to the $CO_2$ recovery device 40, supply of steam can be continuously performed so that a $CO_2$ recovery rate can be maintained over a period in which the gas turbine 10 is in operation.

Fourth Embodiment

In the first to third embodiments, control has been described in which the medium-pressure backup steam pressure adjustment valve V4 is opened when the low-pressure steam governing valve V2 and the like are closed, so that medium-pressure steam is supplied to the $CO_2$ recovery device 40. Since the temperature of steam in the medium-pressure line is relatively high, a device may be damaged or deteriorated in a case where the steam is supplied to the $CO_2$ recovery device 40 in a state where the temperature of the steam is high. Therefore, in a fourth embodiment, control is added in which the temperature adjustment spray valve SPV2 is opened so that misty water is sprayed to medium-pressure steam and the temperature of the medium-pressure steam is reduced. For example, temperature adjustment control is started by opening the temperature adjustment spray valve SPV2 at the same time as an operation of opening the medium-pressure backup steam pressure adjustment valve V4.

The temperature adjustment spray valve SPV2 may be opened at a fixed opening degree based on a set value determined in advance or may be feedback-controlled such that the temperature measured by the thermometer T1 provided at a stage after the temperature adjustment spray valve SPV2 coincides with a target value. Alternatively, the feedback control and control in which the temperature adjustment spray valve SPV2 is opened at the predetermined opening degree may be combined with each other.

Operation

Next, the flow of control at the time of an ST trip will be described with reference to FIG. 6.

Figure 6:
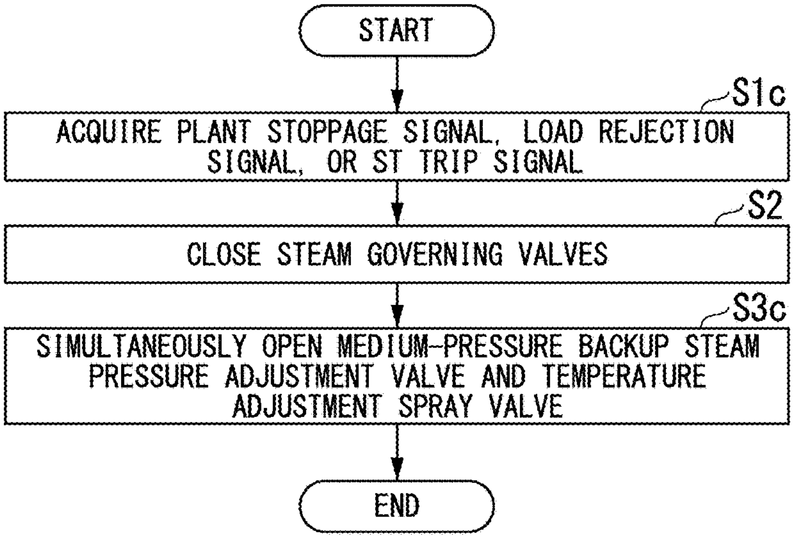
FIG. 6 is a flowchart showing an example of control according to a fourth embodiment.

FIG. 6 is a flowchart showing an example of control according to the fourth embodiment.

First, the control device 50 acquires a plant stoppage signal, a load rejection signal, or an ST trip signal (step S1*c*). In a case where the signals are acquired, the control device 50 closes the low-pressure steam governing valve V2, the medium-pressure steam governing valve V7, and the high-pressure steam governing valve V5 (step S2). Next, the control device 50 changes the state of the medium-pressure backup steam pressure adjustment valve V4 from a closed state to an opened state and at the same time, changes the state of the temperature adjustment spray valve SPV2 from a closed state to an opened state (step S3*c*). The control device 50 may perform feedback control of the opening degree of the temperature adjustment spray valve SPV2 such that the temperature measured by the thermometer T1 becomes a predetermined target value, or may open the temperature adjustment spray valve SPV2 at a predetermined fixed opening degree. Alternatively, the temperature adjustment spray valve SPV2 may be opened with the feedback control and control in which the temperature adjustment spray valve SPV2 is opened at the predetermined fixed opening degree combined with each other.

In the case of the processing flow of FIG. 6, steps S1*c*, S2, and S3*c* are performed in the above-described order. However, processing in step S2 and processing in step S3*c* may be performed at the same time or the order in which step S2 and step S3*c* are performed may be reversed.

Advantageous Effects

As described above, in the fourth embodiment, the temperature adjustment spray valve SPV2 is opened at the same time as the medium-pressure backup steam pressure adjustment valve V4. Accordingly, a device can be prevented from being damaged or deteriorated due to excessive entry of heat into the $CO_2$ recovery device 40 which occurs in the case of a rapid increase in amount of medium-pressure steam of which the temperature is relatively high.

Fifth Embodiment

In the first to fourth embodiments, control has been described in which the medium-pressure backup steam pressure adjustment valve V4 is opened for supply of medium-pressure steam to the $CO_2$ recovery device 40 in a situation where the amount of supply of steam to the $CO_2$ recovery device 40 is reduced due to the closing of the low-pressure steam governing valve V2 and the like. Meanwhile, in a case where the medium-pressure backup steam pressure adjustment valve V4 is left open, the medium-pressure steam is continuously supplied to the $CO_2$ recovery device 40 and after the gas turbine 10 is stopped (after fuel is cut off), the amount of heat retained by steam in the HRSG 20 is reduced since there is no entry of heat. In a case where the amount of heat retained in the HRSG 20 is excessively reduced, it is necessary to heat the inside of the HRSG 20 again at the time of the next activation of the plant 100. Therefore, there may be an increase in time taken for activation of the plant 100 or required fuel flow rate of the gas turbine 10. In addition, after fuel of the gas turbine 10 is cut off, there is no generation of $CO_2$ caused by combustion. Therefore, the amount of steam required in the $CO_2$ recovery device 40 is zero or very small and thus supply of steam is not necessary. Therefore, in a fifth embodiment, the medium-pressure backup steam pressure adjustment valve V4 is closed at the same time as when fuel of the gas turbine 10 is cut off. Accordingly, it is possible to prevent heat from flowing out of the system of the HRSG 20.

Operation

Next, the flow of control according to the present embodiment at the time of stoppage of the plant, load rejection, or an ST trip will be described with reference to FIG. 7.

Figure 7:
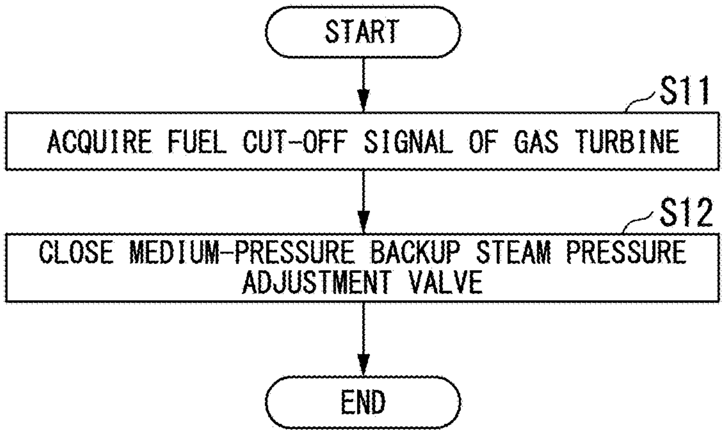
FIG. 7 is a flowchart showing an example of control according to a fifth embodiment.

FIG. 7 is a flowchart showing an example of control according to the fifth embodiment.

As a premise, a situation where the medium-pressure backup steam pressure adjustment valve V4 has been opened by means of the control in the first to fourth embodiments will be assumed.

First, the control device 50 acquires a fuel cut-off signal indicating that fuel to the gas turbine 10 has been cut off (step S11). In a case where the fuel cut-off signal is acquired, the control device 50 closes the medium-pressure backup steam pressure adjustment valve V4 (step S12). In a case where the fifth embodiment is combined with the fourth embodiment, the temperature adjustment spray valve SPV2 is also closed in addition to the medium-pressure backup steam pressure adjustment valve V4.

Advantageous Effects

According to the fifth embodiment, it is possible to prevent an amount of heat retained in the HRSG 20 from flowing out due to excessive supply of steam from the GTCC to the $CO_2$ recovery device 40 and to maintain the temperature inside the HRSG 20 in preparation for the next activation of the GTCC.

As described above, according to the first to fifth embodiments, in a plant in which a GTCC and a $CO_2$ recovery device are combined with each other, a sufficient amount of steam can be supplied to the $CO_2$ recovery device even in situations where there may be a decrease in amount of supply of steam to the $CO_2$ recovery device like a situation where the plant is stopped, a situation where there is load rejection, or a situation where an ST trip occurs.

Figure 8:
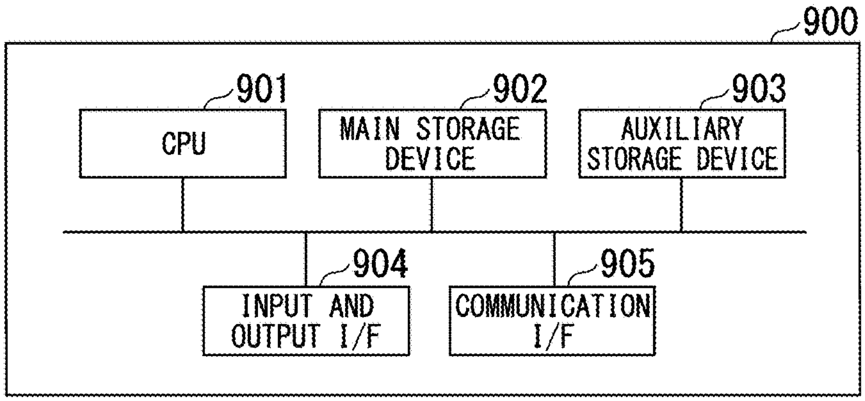
FIG. 8 is a diagram showing an example of the hardware configuration of a control device according to each embodiment.

FIG. 8 is a diagram showing an example of the hardware configuration of a control device according to each embodiment. A computer 900 includes a CPU 901, a main storage device 902, an auxiliary storage device 903, an input and output interface 904, and a communication interface 905. The control device 50 described above is implemented in the computer 900. In addition, each function described above is stored in the auxiliary storage device 903 in the form of a program. The CPU 901 reads a program from the auxiliary storage device 903, deploys the program in the main storage device 902, and executes the above-described processes according to the program. In addition, the CPU 901 secures a storage area in the main storage device 902 according to the program. The CPU 901 secures a storage area for storage of data, of which processing is in progress, in the auxiliary storage device 903 according to the program.

Processing performed by each functional unit may be performed by recording a program for realization of all or some of the functions of the control device 50 on a computer-readable recording medium, and reading and executing the program recorded on the recording medium in a computer system. The term "computer system" as used here refers to a computer system that includes an OS and hardware such as a peripheral device. In addition, the "computer system" includes a homepage providing environment (or a display environment) in a case where a WWW system is used. The term "computer-readable recording medium" refers to a portable medium, such as a CD, a DVD, or a USB, or a storage device, such as a hard disk incorporated in the computer system. In addition, in a case where this program is distributed to the computer 900 via a communication line, the computer 900 receiving the distribution may deploy the program in the main storage device 902 and may perform the above-described processing. In addition, the program may realize some of the above-described functions, and, furthermore, may be capable of realizing the above-described functions in combination with a program previously recorded in the computer system.

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

Supplementary Notes

The steam supply system and the steam supply method described in each embodiment are understood as follows, for example.

(1) A steam supply system according to a first aspect is a steam supply system that supplies steam generated at a heat recovery steam generator (20) to a $CO_2$ recovery device (40) that recovers $CO_2$ from an exhaust gas discharged by a power plant including a gas turbine (10), the heat recovery steam generator (20), and a steam turbine (30), the system including a low-pressure line (L1, L9) through which low-pressure steam is supplied from the heat recovery steam generator (20) to the steam turbine (30), a first line (L2) that is connected to the low-pressure line and through which the low-pressure steam is extracted from the low-pressure line and is supplied to the $CO_2$ recovery device, a low-pressure steam governing valve (V2) that is provided upstream of a connection position of the low-pressure line with the first line, a medium-pressure line (L7, L7') through which medium-pressure steam is supplied from the heat recovery steam generator to the steam turbine, a second line (L10) that is connected to the medium-pressure line and through which the medium-pressure steam is extracted from the medium-pressure line and is supplied to the first line, a medium-pressure steam governing valve (V7) provided at the medium-pressure line, a steam backup valve (V4) provided at the second line, and a control device (50), in which the control device closes the low-pressure steam governing valve (V2) and the medium-pressure steam governing valve (V7) and opens the steam backup valve (V4) based on a state of operation of the power plant.

Accordingly, it is possible to supplement the amount of supply of steam to a $CO_2$ recovery device and to maintain a $CO_2$ recovery rate in a plant in which a GTCC and a $CO_2$ recovery device are combined with each other even in the case of a state of operation in which the amount of supply of low-pressure steam from the GTCC to the $CO_2$ recovery device is reduced.

(2) A steam supply system according to a second aspect is the steam supply system of (1), in which the second line is provided with a temperature adjustment spray (SP2) for reduction of the temperature of the medium-pressure steam and a temperature adjustment spray valve (SPV2) for adjustment of an amount of water sprayed from the temperature adjustment spray, and the control device opens the steam backup valve (V4) and opens the temperature adjustment spray valve in a case where the steam backup valve (V4) is to be opened.

Accordingly, it is possible to prevent damage or the like to a device that is caused in a case where the medium-pressure steam of which the temperature is relatively high is supplied to the $CO_2$ recovery device.

(3) A steam supply system according to a third aspect is the steam supply system of (1) or (2), in which the control device closes the steam backup valve (V4) in a case where supply of fuel to the gas turbine is cut off after the steam backup valve (V4) is opened.

Accordingly, the temperature of the HRSG can be maintained.

(4) A steam supply system according to a fourth aspect is the steam supply system of any one of (1) to (3), in which the control device closes the low-pressure steam governing valve and opens the steam backup valve in a case of stoppage of the power plant.

Accordingly, even in a situation there may be a shortage of supply of steam at the time of stoppage of the power plant, supply of steam to the $CO_2$ recovery device can be continuously performed so that a $CO_2$ recovery rate can be maintained.

(5) A steam supply system according to a fifth aspect is the steam supply system of any one of (1) to (4), in which the control device closes the low-pressure steam governing valve and opens the steam backup valve in a case of load rejection of the power plant.

Accordingly, even in a situation there may be a shortage of supply of steam at the time of load rejection of the power plant, supply of steam to the $CO_2$ recovery device can be continuously performed so that a $CO_2$ recovery rate can be maintained.

(6) A steam supply system according to a sixth aspect is the steam supply system of any one of (1) to (5), in which the control device closes the low-pressure steam governing valve and opens the steam backup valve in a case of a trip of the steam turbine.

Accordingly, even in a situation there may be a shortage of supply of steam at the time of an ST trip, supply of steam to the $CO_2$ recovery device can be continuously performed so that a $CO_2$ recovery rate can be maintained.

(7) A steam supply system according to a seventh aspect is the steam supply system of any one of (1) to (6), in which the control device closes the low-pressure steam governing valve and opens the steam backup valve in a situation where the steam turbine is stopped while the power plant is operating and the gas turbine continues to operate.

Accordingly, even in a situation where supply of steam to the steam turbine is cut off, supply of steam to the $CO_2$ recovery device can be continuously performed so that a $CO_2$ recovery rate can be maintained as long as the gas turbine is in operation.

(8) A steam supply system according to an eighth aspect is the steam supply system of any one of (1) to (7), in which, in a case where the steam backup valve is to be opened, the control device performs feedback control of an opening degree of the steam backup valve such that a pressure at a stage after the steam backup valve becomes a target value.

Accordingly, it is possible to stably and continuously supply steam to the $CO_2$ recovery device.

(9) A steam supply system according to a ninth aspect is the steam supply system of any one of (1) to (8), in which, in a case where the steam backup valve is to be opened, the control device opens the steam backup valve at a predetermined opening degree in a state where the power plant is transitional and performs feedback control of an opening degree of the steam backup valve such that a pressure at a stage after the steam backup valve becomes a target value in other cases.

Accordingly, it is possible to stably and continuously supply steam to the $CO_2$ recovery device.

(10) A steam supply system according to a tenth aspect is the steam supply system of any one of (2) to (9), in which, in a case where the temperature adjustment spray valve is to be opened, the control device performs feedback control of an opening degree of the temperature adjustment spray valve such that the temperature of the medium-pressure steam at a stage after the temperature adjustment spray valve becomes a target value.

Accordingly, the temperature of steam supplied to the $CO_2$ recovery device can be controlled to become an appropriate temperature.

(11) A steam supply system according to an eleventh aspect is the steam supply system of any one of (2) to (9), in which, in a case where the temperature adjustment spray valve is to be opened, the control device opens the temperature adjustment spray valve at a predetermined opening degree in a state where the power plant is transitional and performs feedback control of an opening degree of the temperature adjustment spray valve such that the temperature of the medium-pressure steam at a stage after the temperature adjustment spray valve becomes a target value in other cases.

Accordingly, the temperature of steam supplied to the $CO_2$ recovery device can be controlled to become an appropriate temperature.

(12) A steam supply method according to a twelfth aspect is a steam supply method of supplying steam generated by a heat recovery steam generator to a CO2 recovery device in a plant including a power plant that includes a gas turbine, the heat recovery steam generator, and a steam turbine, the CO2 recovery device that recovers CO2 from an exhaust gas of the power plant, a first line through which low-pressure steam is extracted from a low-pressure line for supply of the low-pressure steam from the heat recovery steam generator to the steam turbine and is supplied to the CO2 recovery device, a second line through which medium-pressure steam is extracted from a medium-pressure line for supply of the medium-pressure steam from the heat recovery steam generator to the steam turbine and is supplied to the first line, a low-pressure steam governing valve that is provided upstream of a connection position of the low-pressure line with the first line, a medium-pressure steam governing valve provided at the medium-pressure line, and a steam backup valve provided at the second line, the method including closing the low-pressure steam governing valve and the medium-pressure steam governing valve and opening the steam backup valve based on a state of operation of the power plant.

EXPLANATION OF REFERENCES

100: plant
10: gas turbine
20: HRSG
21L: low-pressure economizer
21I: medium-pressure economizer
21H: high-pressure economizer
22L: low-pressure evaporator
22I: medium-pressure evaporator
22H: high-pressure evaporator
23L: low-pressure superheater
23I: medium-pressure superheater
23H: high-pressure superheater
24: reheater
25L: low-pressure drum
25I: medium-pressure drum
25H: high-pressure drum
30: steam turbine
31: high-pressure turbine
32: medium-pressure turbine
33: low-pressure turbine
40: $CO_2$ recovery device
50: control device
G1, G2: generator
P1, P2: pressure gauge
T1: thermometer
SP1, SP2: temperature adjustment spray
SPV1, SPV2: temperature adjustment spray valve
V1: low-pressure turbine bypass valve
V2: low-pressure steam governing valve
V3: low-pressure steam extraction valve
V4: medium-pressure backup steam pressure adjustment valve
V5: high-pressure steam governing valve
V6: high-pressure turbine bypass valve
V7: medium-pressure steam governing valve
V8: medium-pressure turbine bypass valve
L1 to L11: line
900: Computer
901: CPU
902: main storage device
903: auxiliary storage device
904: input and output interface
905: communication interface

What is claimed is:

1. A steam supply system that supplies steam generated at a heat recovery steam generator to a $CO_2$ recovery device that recovers $CO_2$ from an exhaust gas discharged by a power plant including a gas turbine, the heat recovery steam generator, and a steam turbine, the system comprising:
   - a low-pressure line through which low-pressure steam is supplied from the heat recovery steam generator to the steam turbine;
   - a first line that is connected to the low-pressure line and through which the low-pressure steam is extracted from the low-pressure line and is supplied to the $CO_2$ recovery device;
   - a low-pressure steam governing valve that is provided upstream of a connection position of the low-pressure line with the first line;
   - a medium-pressure line through which medium-pressure steam is supplied from the heat recovery steam generator to the steam turbine;
   - a second line that is connected to the medium-pressure line and through which the medium-pressure steam is extracted from the medium-pressure line and is supplied to the first line;
   - a medium-pressure steam governing valve provided at the medium-pressure line;
   - a steam backup valve provided at the second line; and
   - a control device,
   - wherein the control device closes the low-pressure steam governing valve and the medium-pressure steam governing valve and opens the steam backup valve based on a state of operation of the power plant.

2. The steam supply system according to claim 1,
   - wherein the second line is provided with a temperature adjustment spray for reduction of a temperature of the medium-pressure steam and a temperature adjustment spray valve for adjustment of an amount of water sprayed from the temperature adjustment spray, and
   - the control device opens the steam backup valve and opens the temperature adjustment spray valve in a case where the steam backup valve is to be opened.

3. The steam supply system according to claim 1, wherein the control device closes the steam backup valve in a case where supply of fuel to the gas turbine is cut off after the steam backup valve is opened.

4. The steam supply system according to claim 1, wherein the control device closes the low-pressure steam governing valve and opens the steam backup valve in a case of stoppage of the power plant.

5. The steam supply system according to claim 1, wherein the control device closes the low-pressure steam governing valve and opens the steam backup valve in a case of load rejection of the power plant.

6. The steam supply system according to claim 1, wherein the control device closes the low-pressure steam governing valve and opens the steam backup valve in a case of a trip of the steam turbine.

7. The steam supply system according to claim 1, wherein the control device closes the low-pressure steam governing valve and opens the steam backup valve in a situation where the steam turbine is stopped while the power plant is operating and the gas turbine continues to operate.

8. The steam supply system according to claim 1, wherein, in a case where the steam backup valve is to be opened, the control device performs feedback control of an opening degree of the steam backup valve such that a pressure at a stage after the steam backup valve becomes a target value.

9. The steam supply system according to claim 1, wherein, in a case where the steam backup valve is to be opened, the control device opens the steam backup valve at a predetermined opening degree in a state where the power plant is transitional and performs feedback control of an opening degree of the steam backup valve such that a pressure at a stage after the steam backup valve becomes a target value in other cases.

10. The steam supply system according to claim 2, wherein, in a case where the temperature adjustment spray valve is to be opened, the control device performs feedback control of an opening degree of the temperature adjustment spray valve such that a temperature of the medium-pressure steam at a stage after the temperature adjustment spray valve becomes a target value.

11. The steam supply system according to claim 2, wherein, in a case where the temperature adjustment spray valve is to be opened, the control device opens the temperature adjustment spray valve at a predetermined opening degree in a state where the power plant is transitional and performs feedback control of an opening degree of the temperature adjustment spray valve such that a temperature of the medium-pressure steam at a stage after the temperature adjustment spray valve becomes a target value in other cases.

12. A steam supply method of supplying steam generated by a heat recovery steam generator to a $CO_2$ recovery device in a plant including a power plant that includes a gas turbine, the heat recovery steam generator, and a steam turbine, the $CO_2$ recovery device that recovers $CO_2$ from an exhaust gas of the power plant, a first line through which low-pressure steam is extracted from a low-pressure line for supply of the low-pressure steam from the heat recovery steam generator to the steam turbine and is supplied to the $CO_2$ recovery device, a second line through which medium-pressure steam is extracted from a medium-pressure line for supply of the medium-pressure steam from the heat recovery steam generator to the steam turbine and is supplied to the first line, a low-pressure steam governing valve that is provided upstream of a connection position of the low-pressure line with the first line, a medium-pressure steam governing valve provided at the medium-pressure line, and a steam backup valve provided at the second line, the method comprising:

closing the low-pressure steam governing valve and the medium-pressure steam governing valve and opening the steam backup valve based on a state of operation of the power plant.

* * * * *